ns the fact that the catalyst is less expensive than those previously recommended. The better quality of the product is shown by the fact that there is less benzene in the thiophene. Moreover, less carbon and sulfur are deposited on a chromia-alumina catalyst promoted with potassia, silica and iron oxide than are deposited on conventional chromia-alumina catalysts.

2,694,074

PRODUCTION OF THIOPHENE COMPOUNDS

Lebbeus C. Kemp, Jr., Scarsdale, N. Y., assignor to The Texas Company, New York, N. Y., a corporation of Delaware No Drawing. Application October 30, 1948, Serial No. 57,629

2 Claims. (Cl. 260—332.8)

This invention relates to an improved process for the preparation of heterocyclic sulfur compounds and particularly to an improved process for the production of compounds containing a thiophene nucleus.

Heterocyclic sulfur compounds such as those containing a thiophene nucleus have, in the past, been primarily of academic interest due to the uneconomical and difficult methods required for the preparation thereof. Recent developments, however, have shown that thiophene and compounds containing a thiophene nucleus may be synthesized by a method involving the use of economical charge stocks which is readily adapted to commercial operations. In copending applications, Serial No. 630,148, filed November 21, 1945, and Serial No. 773,310, filed September 10, 1947, both of which have now been abandoned, which are entitled "Preparation of Thiophene Compounds" and of which Louis E. Ruidisch and DuBois Eastman are the co-inventors, there is disclosed a process for the production of thiophene compounds by reacting organic compounds containing an aliphatic chain of at least two carbon atoms with hydrogen sulfide in the presence of a surface-active catalyst. The feasibility of producing thiophene compounds by this process brings thiophene compounds within the realm of industrial commercial chemicals in the class of benzene, toluene, etc. In another copending application Serial No. 773,308, filed September 10, 1947, now abandoned, entitled "Production of Thiophene" of which Meredith M. Stewart and Lawrence W. Devaney are the co-inventors, there is disclosed an improvement in the aforesaid process for producing thiophene compounds which comprises effecting reaction between the organic compound having an aliphatic chain of at least two carbon atoms with hydrogen sulfide in the presence of a dehydrogenation catalyst comprising mainly silica-stabilized alumina which can be regenerated to a high level of activity.

The improved process of the subject invention involves broadly the production of compounds containing a thiophene nucleus by the vapor phase reaction of organic compounds containing an aliphatic chain of at least two carbon atoms with hydrogen sulfide at an elevated temperature of at least 700° F. in the presence of a dehydrogenation catalyst containing a chromia-alumina catalyst promoted with potassia, silica and iron oxide. A volatile thermally labile sulfide may be used in place of or in addition to hydrogen sulfide. An organic compound containing thiophene nucleus is recovered from the reaction product.

The process of the invention is similar to that described in the heretofore mentioned copending applications. The present invention constitutes an improvement over the previously disclosed process in that the catalyst herein employed regenerates to a higher degree of catalyst activity in a shorter time than do previously disclosed catalysts and in addition effects higher conversion of hydrocarbons to thiophene. The ability of the catalyst disclosed herein to be regenerated to a sustained high level of activity even after many cycles of reaction and regeneration effects a substantial improvement in the heretofore disclosed process, both from an economic and operational standpoint, since shut-down periods for replacement of spent catalyst are materially reduced.

Additional advantages of the process of preparing thiophene compounds in accordance with the method of this invention by employing a chromia-alumina catalyst promoted with potassia, silica and iron oxide reside in the fact that a higher quality product is obtained and also In the aforementioned copending applications, chromia-alumina and molybdenum oxide-alumina were disclosed as specially preferred catalysts for the production of thiophene. The use of these conventional dehydrogenation catalysts is accompanied by one serious drawback, namely, the difficulty of regenerating them to a high degree of activity. In Serial No. 773,308, now abandoned, it was revealed that a dehydrogenation catalyst containing silica-stabilized alumina as a base possessed markedly improved regeneration properties. Conventional chromia-alumina, molybdena-alumina catalysts and catalysts having a silica-stabilized alumina base such as chromia-silica-alumina were shown to possess approximately equivalent initial activity but the latter type catalysts regenerated to approximately double the activity of the conventional chromia-alumina catalyst after regeneration. Chromia-alumina, molybdena-alumina catalysts, as well as a dehydrogenation catalyst containing a silica-stabilized alumina base such as chromia-silica-alumina have an initial activity of approximately 45 weight per cent conversion of hydrocarbon to thiophene. However, after repeated cycles of reaction and regeneration, the activity of conventional chromia-alumina and molybdena-alumina catalysts levels off at about 15 per cent conversion of hydrocarbon to thiophene; the activity of the silica-stabilized alumina base catalyst, for example, chromia-silica-alumina, leveled off at about 30 weight per cent conversion of hydrocarbon to thiophene.

The catalyst employed in the process of this invention has an average initial activity of about 53 weight per cent conversion of hydrocarbon charged to thiophene; on the basis of hydrocarbon consumed, this activity amounts to approximately a 65 to 70 weight per cent conversion. A conversion to thiophene as high as 69 weight per cent on the basis of butylene charged and 87.9 weight per cent on the basis of butylene consumed has been obtained employing the potassia-, silica-, and iron oxide-promoted chromia-alumina catalyst of this invention. It is apparent that the catalyst employed in the process of this invention effects substantially higher conversions of hydrocarbons to thiophene compounds than do the catalysts recommended in the aforementioned co-pending applications.

After two regenerations of potassia-, silica-, iron oxide-promoted chromia-alumina, the catalyst effected a 56 weight per cent conversion per pass of butylene-2 to thiophene whereas a chromia-silica-alumina catalyst, a silica-stabilized alumina base catalyst, effected only a 48 weight per cent per pass of butylene-2 to thiophene after two regenerations. Moreover, on the average, only about 1.7 hours are required for regeneration of the novel catalyst employed in the process of this invention, whereas an average period of 2.8 hours is required for regeneration of a silica-stabilized alumina base catalyst such as silica-chromia-alumina. From an analysis of these figures, it will be readily apparent that the catalyst employed in the process of this invention not only regenerates to a substantially higher level of activity but also requires less time for the attainment of a higher level of activity than do catalysts which were previously recommended as preferred for production of thiophene from aliphatic hydrocarbons.

The novel catalyst of the process of this invention comprises approximately 75 to 85 per cent alumina, 7 to 17 per cent chromia, 3 to 9 per cent silica, 1 to 4 per cent iron oxide and 0.5 to 2 per cent potassia. A representative novel catalyst which is commercially available contains about 79.5 per cent alumina, 12 per cent chromia, 6 per cent silica, 2 per cent iron oxide and one per cent potassia.

The process of the invention is especially applicable to the production of thiophene itself or to thiophene compounds possessing acyclic substituents. The type of thiophene compounds produced by the reaction process is dependent to a large extent on the choice of charge stock used in the reaction. To produce either thiophene or thiophene derivatives containing an acyclic constituent, the charge material is preferably a saturated or unsaturated acyclic hydrocarbon having at least 2 aliphatic carbon atoms in a chain or a mixture of organic compounds containing a substantial portion of hydrocarbons of this type. Low molecular weight aliphatic hydrocarbons such as are produced from the processing of petroleum or natural gas constitute suitable charge stocks for the preparation of thiophene and lower acyclic homologs. When acyclic hydrocarbons containing more than 4 carbon atoms are used in the reaction, acyclic homologs of thiophene containing one or more side chains are the predominant product. There appears to be no upper limit on the chain length of the hydrocarbons which may be employed as charge stock provided that the hydrocarbons be in the vapor form under reaction conditions. When relatively simple reaction products are desired, however, it is advisable to employ a charge stock containing predominant amounts of hydrocarbons having from 4 to 10 carbon atoms per molecule.

The process also contemplates the use of compounds other than acyclic hydrocarbons as the charge stock. There may be employed substituted acyclic hydrocarbons containing at least 2 aliphatic carbon atoms in a chain in which the substituents either remain attached to the acyclic hydrocarbon during the reaction, or are removed during the reaction to form compounds which do not have a substantially adverse effect upon the reaction. Examples of such substituted acyclic hydrocarbons are halogenated aliphatic hydrocarbons such as chlorobutane and saturated or unsaturated aliphatic alcohols having at least 2 carbon atoms in a chain such as butyl alcohol. Cyclic compounds in which there is attached to the cyclic nucleus an acyclic aliphatic side chain containing at least 2 carbon atoms may also be employed as the charge stock. Aryl-substituted acyclic hydrocarbons such as ethyl, propyl or butyl benzene or corresponding derivatives of naphthalene constitute examples of this class of compounds which can be used as the charge stock to produce thiophene derivatives. Cyclo-aliphatic compounds such as cyclopropane and cyclobutane, in which the cyclic nucleus is unstable at elevated temperatures, may also be used as the charge stock.

As previously stated, the sulfur reactant may be either hydrogen sulfide or a volatile thermally labile sulfide. Although hydrogen sulfide is the preferred reactant, other sulfides which are volatile and thermally labile under the conditions of reaction may be used as the source of the sulfur. These sulfides include organic and inorganic sulfides, hydrosulfides and polysulfides which are decomposed to hydrogen sulfide and/or sulfur under reaction conditions. Metal sulfides are excluded from the inorganic sulfides which may be used as they decompose to non-volatile metallic constituents which tend to deposit on the catalytic surfaces and destroy catalyst activity. Thus, only the non-metal and metalloid inorganic sulfides are included within the scope of inorganic volatile thermally labile sulfides; examples of such are ammonium sulfide, ammonium hydrosulfide and ammonium polysulfide. Useful volatile thermally labile organic sulfides include the aliphatic mercaptans and sulfides, particularly those containing a tertiary carbon atom; ethyl mercaptans, ethyl sulfide, tertiary butyl mercaptan and tertiary butyl sulfide illustrate the organic members of this class.

In carrying out the process of the invention, the reactants in vapor form are introduced into a reaction chamber containing a solid contact catalyst maintained at the desired reaction temperature. The catalytic reaction zone may either be a fixed bed type or a fluid type, in which latter type operation the catalyst is maintained in powder form in a turbulent state.

It is evident the process may be operated in accordance with any of the usual techniques for high temperature catalytic conversions. Thus, fixed catalyst beds may be used in alternate reaction and regeneration cycles; fluid catalyst operation may be used wherein the catalyst is continuously withdrawn from the catalyst zone, regenerated and reintroduced into the catalyst zone after regeneration; fluidized fixed bed operation may also be used in which the catalyst particles remain in the reaction zone during alternate reaction and regeneration cycles; stirred catalyst beds, as well as moving catalyst beds of the Thermofor type, are other possible alternatives.

It will be recognized that the conditions of reaction will vary in accordance with the particular hydrocarbon employed as a reactant, as well as with the type of process technique. As a general proposition, however, temperatures of at least 700° F., space velocity of about 0.1 to 10.0, wherein space velocity defines the weight of hydrocarbon per hour per weight of catalyst, and a mol ratio of hydrogen sulfide to hydrocarbon within the range of 0.1 to 10.0 are preferred in the majority of reactions.

The particular conditions of reaction are best illustrated by reference to conditions involved in the reaction of an unsaturated acyclic hydrocarbon such as butylene, over 100 to 200 mesh potassia-, silica-, iron oxide-promoted chromia-alumina catalyst employing a fluidized bed type of process technique. When charging butylene-2 over this catalyst, the space velocity advantageously falls within the range of 0.5 to 5.0; the mol ratio of hydrogen sulfide to butylene-2 preferably lies within the range of 1.0 to 4.0; the temperature in the fluidized catalyst zone is maintained between about 700 to 1400° F. and preferably between 950 to 1200° F. It is to be understood that the specific conditions described as optimum are those which result in optimum yields of thiophene in a single pass operation. Where a continuous recycle process is used, it may be desirable to modify these conditions of reaction in order to obtain an optimum ultimate yield of the desired product.

The process period for optimum thiophene production without continuous catalyst regeneration will depend, to some extent, on the charge stock and the reaction conditions employed but will generally be of longer duration than one hour. In any case, periodic determination of thiophene yields will indicate the practical period of catalyst activity before regeneration. When the thiophene yields are found to fall off sharply, the catalyst is then regenerated.

The regeneration of the novel catalysts is effected in accordance with any of the usual techniques for regeneration of solid catalysts. Thus, the catalyst is regenerated in a fixed bed, if a fixed bed technique is used in effecting the preparation of thiophene. Air, oxygen-enriched air or nitrogen-enriched air is passed through the spent catalyst at an elevated temperature for a period of time determined by the disappearance of carbon dioxide in the off-gas from the regeneration; it has been found that in most cases, the disappearance of carbon dioxide in the regenerator off-gas indicates substantially complete regeneration.

Thiophene compounds produced by the reaction may be recovered from the reaction products in accordance with conventional methods of recovery. For example, the reaction products containing unreacted charge stocks, sulfur, cracked products of charge stock, diolefinic compounds and unreacted hydrogen sulfide may be passed through a caustic soda solution to dissolve the acid gases. If the caustic soda solution is maintained cold, thiophene will condense as a supernatant layer; the thiophene layer can be drawn off therefrom and distilled. If the caustic soda solution is maintained hot, the thiophene compounds will steam distill from the caustic solution and can then be separated from the water layer and purified by distillation.

The thiophene compounds may also be recovered in crude form by a simple condensation procedure which involves passing the products into a cooled body of hydrocarbon oil such as kerosene, in which the thiophene compounds will condense; thiophene compounds can later be recovered from the condensing oil by distillation.

The process of the invention is illustrated in detail by the following specific examples. Examples I and II are inserted for illustrative purposes and demonstrate the results obtained in the conversion of hydrocarbons into thiophene employing conventional chromia-alumina catalyst and a silica-stabilized alumina base catalyst such as chromia-silica-alumina. Examples III, IV and V demonstrate the results obtained by employing a potassia-, silica-, iron oxide- promoted chromia-alumina catalyst to effect conversion of hydrocarbons into thiophene. Example VI shows the activity of potassia-, silica-, iron oxide-promoted chromia-alumina catalyst before and after regeneration; as contrasted with this, Example VII shows the activity of a silica-stabilized chromia-alumina catalyst before and after regeneration.

Example I

Butylene-2 and hydrogen sulfide in a mol ratio of about 2.2 mols of hydrogen sulfide per mol of butylene-2 were mixed, preheated to approximately reaction temperature and charged to a catalytic reaction chamber maintained at about 1119° F. and atmospheric pressure. The catalytic reaction chamber is a vertical reaction zone wherein 420 grams of 4 to 10 mesh catalyst were maintained. The catalyst consisted of a mixture of chromic oxide and alumina and had the approximate composition of 10 per cent $Cr_2O_3$ and 90 per cent $Al_2O_3$ by weight. The reactants were charged at a liquid hydrocarbon space velocity of approximately 1.0 weights of butylene-2 per hour per weight of catalyst. The catalyst was maintained on stream for a period of about 60 minutes without reactivation. Distilled thiophene containing less than 0.5 mol per cent impurities was obtained in a yield of about 44.3 weight pounds of thiophene per 100 pounds of butylene-2 charged; on an ultimate basis of butylene consumed, 63.5 pounds of thiophene per 100 pounds of butylene were obtained.

Example II

Butylene-2 and hydrogen sulfide in a mol ratio of about 2.3 mols of hydrogen sulfide per mol of butylene-2 were mixed, preheated to approximately reaction temperature and charged to a catalytic reaction chamber maintained at 1100° F. and atmospheric pressure. The catalytic reaction chamber was a vertical reaction zone wherein 500 grams of 100 to 200 mesh catalyst were maintained in a fluidized state by passage of the reactants therethrough. The catalyst consisted of a mixture of chromic oxide and silica-stabilized alumina having the approximate composition of 5% $SiO_2$, 10% $Cr_2O_3$ and 85% $Al_2O_3$ by weight. The catalyst was prepared by adding a solution of 327 grams of chromic acid, $CrO_3$, in 2500 cc. of water in small portions with good mixing to 2250 grams of silica-stabilized alumina having an alkali content of about 0.08 per cent; the mixture was evaporated to dryness, calcined at 1000° F. for 6 hours prior to being ground to 100–200 mesh. The reactants were charged at a liquid hydrocarbon space velocity of approximately 0.75 weights of butylene-2 per hour per weight of catalyst. The catalyst was maintained on stream for a period of about 45 minutes without reactivation. Crude thiophene of about 95 per cent purity was obtained in a yield of about 45.2 pounds of thiophene per 100 pounds of butylene-2 charged.

Example III

Butylene-2 and hydrogen sulfide in a mol ratio of about 2.1 mols of hydrogen sulfide per mol of butylene-2 were mixed, preheated to approximately reaction temperature and charged to a catalytic reaction chamber maintained at about 1098° F. and atmospheric pressure. The reaction chamber was a vertical reaction zone wherein 420 grams of 4–10 mesh catalyst were maintained. The catalyst was a potassia-, silica-, iron oxide-promoted chromia-alumina catalyst having the approximate composition of 79.5 per cent $Al_2O_3$, 12 per cent $Cr_2O_3$, 6 per cent $SiO_2$, 2 per cent $Fe_2O_3$ and one per cent $K_2O$. The reactants were charged at a liquid hydrocarbon space velocity of approximately 1.0 weights of butylene-2 per hour per weight of catalyst. The catalyst was maintained on stream for a period of about 60 minutes without reactivation. Distilled thiophene containing less than 0.5 mol per cent impurities was obtained in a yield of about 52.2 pounds of thiophene per 100 pounds of butylene-2 charged; on an ultimate basis of butylene-2 consumed, this amounted to 62.1 pounds of thiophene per 100 pounds of butylene-2 consumed.

Example IV

Butylene-2 and hydrogen sulfide in a mol ratio of about 2.1 mols of hydrogen sulfide per mol of butylene-2 were mixed, preheated to approximately reaction temperature and charged to a catalytic reaction chamber maintained at 1120° F. and atmospheric pressure. The catalytic reaction chamber was similar to that employed in Example III and contained a catalyst of the composition described in Example III. The reactants were charged at a liquid hydrocarbon space velocity of approximately 1.0 weights of butylene-2 per hour per weight of catalyst. The catalyst was maintained on stream for a period of about 60 minutes without reactivation. Distilled thiophene containing less than 0.5 mol per cent impurities was obtained in a yield of about 58.4 pounds of thiophene per 100 pounds of butylene-2 charged; on an ultimate basis, the yield was 71.4 pounds of thiophene per 100 pounds of butylene-2 consumed.

Example V

Butylene-2 and hydrogen sulfide in a mol ratio of about 1.9 mols of hydrogen sulfide per mol of butylene-2 were mixed, preheated to approximately reaction temperature and charged to a catalytic reaction chamber maintained at about 1107° F. and atmospheric pressure. The catalytic reaction chamber was of the type described in Example III and contained a catalyst of similar composition to that described in Example III. The reactants were charged at a liquid hydrocarbon space velocity of approximately 1.0 weight of butylene-2 per hour per weight of catalyst. The catalyst was maintained on stream for a period of about 60 minutes without reactivation. Crude thiophene of about 95 per cent purity was obtained in a yield of about 69 pounds of thiophene per 100 pounds of butylene-2 charged; on an ultimate basis, the yield was 87.9 pounds of thiophene per 100 pounds of butylene-2 consumed.

Example VI

Butylene-2 and hydrogen sulfide in a mol ratio of about 2.0 mols of hydrogen sulfide per mol of butylene-2 were mixed, preheated to approximately reaction temperature and charged to a catalytic reaction chamber maintained at 1100° F. and atmospheric pressure. The reaction chamber employed was of the type described in Example III and contained a catalyst having the composition described in Example III. The reactants were charged at a liquid hydrocarbon space velocity of approximately 1.1 to 1.4 weights of butylene-2 per hour per weight of catalyst. The catalyst was maintained on stream for a period of about 60 minutes without reactivation. Crude thiophene of at least 95 mol per cent purity was obtained in a yield of about 51 pounds of thiophene per 100 pounds of butylene-2 charged; on an ultimate basis, the yield was 69 pounds of thiophene per 100 pounds of butylene-2 consumed.

After 120 minutes on stream with periodic regeneration of the catalyst at the 60-minute mark and 120-minute mark, this catalyst was still active to the extent that 56 pounds of thiophene were formed per 100 pounds of butylene-2 charged; on an ultimate basis, the yield was 93 pounds of thiophene per 100 pounds of butylene-2 consumed. The other conditions of operation including a process period of one hour was similar to that employed with the fresh catalyst. Regeneration of the catalyst is effected by burning with air at a temperature of about 1200° F. with a maximum burning temperature of about 1400° F. An average time of 1.7 hours was required for the regeneration of the potassia-, silica-, iron oxide-promoted chromia-alumina catalyst.

Example VII

Butylene-2 and hydrogen sulfide in a mol ratio of about 2.0 mols of hydrogen sulfide per mol of butylene-2 were mixed, preheated to approximately reaction temperature and charged to a catalytic reaction chamber maintained at 1100° F. and atmospheric pressure. The catalytic reaction chamber was of the type described in Example I and contained a catalyst of similar composition to that described in Example II, namely, a chromia-silica-alumina type catalyst. The reactants were charged at a liquid hydrocarbon space velocity of 1.1 to 1.4 weights of butylene-2 per hour per weight of catalyst. The catalyst was maintained on stream for a period of about 60 minutes without reactivation. Crude thiophene of at least 95 mol per cent purity was obtained in a yield of about 51 pounds of thiophene per 100 pounds of butylene-2 charged; on an ultimate basis, the yield was 58.6 pounds of thiophene per 100 pounds of butylene-2 consumed.

After 120 minutes on stream with periodic regeneration of the catalyst at the 60-minute and 120-minute mark, this catalyst was active to the extent that 47.4 pounds of thiophene were formed per 100 pounds of butylene-2 charged; on an ultimate basis, 54.2 pounds of thiophene were formed per 100 pounds of butylene-2 consumed. The other conditions of operation, including the process time of 60 minutes, was similar to that employed in Example VI. An average time of 2.8 hours was required for regeneration of the silica-stabilized alumina base catalyst employing the same type of regeneration as that employed in Example VI, namely burning with air at a temperature of about 1200° F. with a maximum burning temperature of 1400° F.

The above examples clearly demonstrate that a potassia-, silica-, iron oxide-promoted chromia-alumina catalyst is superior to conventional chromia-alumina and silica-stabilized alumina base catalyst for the conversion of organic compounds containing an aliphatic chain of at least two carbon atoms with thiophene. Higher yields, shorter generation periods and regeneration to a higher level of activity are realized when the conversion of aliphatic hydrocarbons to thiophene is effected with a potassia-, silica-, iron oxide-promoted chromia-alumina catalyst.

It will be understood, of course, that these examples are merely illustrative of the preferred embodiment of the invention and other charge stocks or conditions of reaction may be employed in accordance with the previous description. By using other selected hydrocarbon charge stocks, thiophene compounds containing various substitutents may be produced by the present process. The novel catalyst can be employed in accordance with the process of the present invention for the production of thianaphthene compounds by the reaction of ethylbenzene or styrene with hydrogen sulfide; the catalyst regenerates into a high level of activity in a shorter period of time in thianaphthene production than do conventional chromia-alumina catalysts or silica-stabilized alumina catalysts. Other acyclic hydrocarbons containing two or more carbon atoms may be employed to produce thiophene itself or thiophene compounds containing acyclic substituents in which the number of carbon atoms in the side chain is dependent upon the number of carbon atoms in the hydrocarbon charge. Further, other organic compounds containing an acyclic aliphatic chain of two or more carbon atoms may be employed to produce a variety of compounds containing a thiophene nucleus.

Obviously many modifications and variations of the invention, as hereinbefore set forth, may be made without departing from the spirit and scope thereof and, therefore, only such limitations should be imposed as are indicated in the appended claims.

I claim:

1. A process for preparing thiophene compounds by passing hydrogen sulfide and an aliphatic hydrocarbon containing at least two carbon atoms into a reaction zone at a space velocity of 0.1 to 10.0 weights of hydrocarbon per hour per weight of catalyst and at a mol ratio of hydrogen sulfide to hydrocarbon between 0.1 and 10.0, reacting said hydrogen sulfide and said hydrocarbon at an elevated temperature of 950 to 1,200° F. in the presence of a catalyst comprising approximately 79 per cent alumina, 12 per cent chromia, 6 per cent silica, 2 per cent iron oxide and 1 per cent potassia, removing from said reaction zone a reaction product containing said thiophene compounds in substantial amount, continuing said reaction until the catalyst activity suffers a sharp decline, regenerating said catalyst by air blowing to a high level of activity and selectivity, and reusing said regenerated catalyst to produce additional quantities of thiophene compounds by reaction of hydrogen sulfide and said hydrocarbon.

2. A process according to claim 1 in which butylene is charged to the reaction zone at a space velocity of about 1 weight of butylene per hour per weight of catalyst and at a mol ratio of about 2 mols of hydrogen sulfide per mol of butylene.

References Cited in the file of this patent

UNITED STATES PATENTS

| Number | Name | Date |
| --- | --- | --- |
| 2,131,089 | Beeck | Sept. 27, 1938 |
| 2,168,840 | Groll | Aug. 8, 1939 |
| 2,315,107 | Chickinoff | Mar. 30, 1943 |
| 2,330,934 | Thacker | Oct. 5, 1943 |
| 2,474,440 | Smith | June 28, 1949 |
| 2,521,429 | Wadley | Sept. 5, 1950 |
| 2,558,507 | Appleby | June 26, 1951 |
| 2,558,508 | Appleby | June 26, 1951 |